Sept. 18, 1934.  H. T. YOUNGREN  1,973,837
DRIVE WHEEL MOUNTING
Filed May 5, 1933
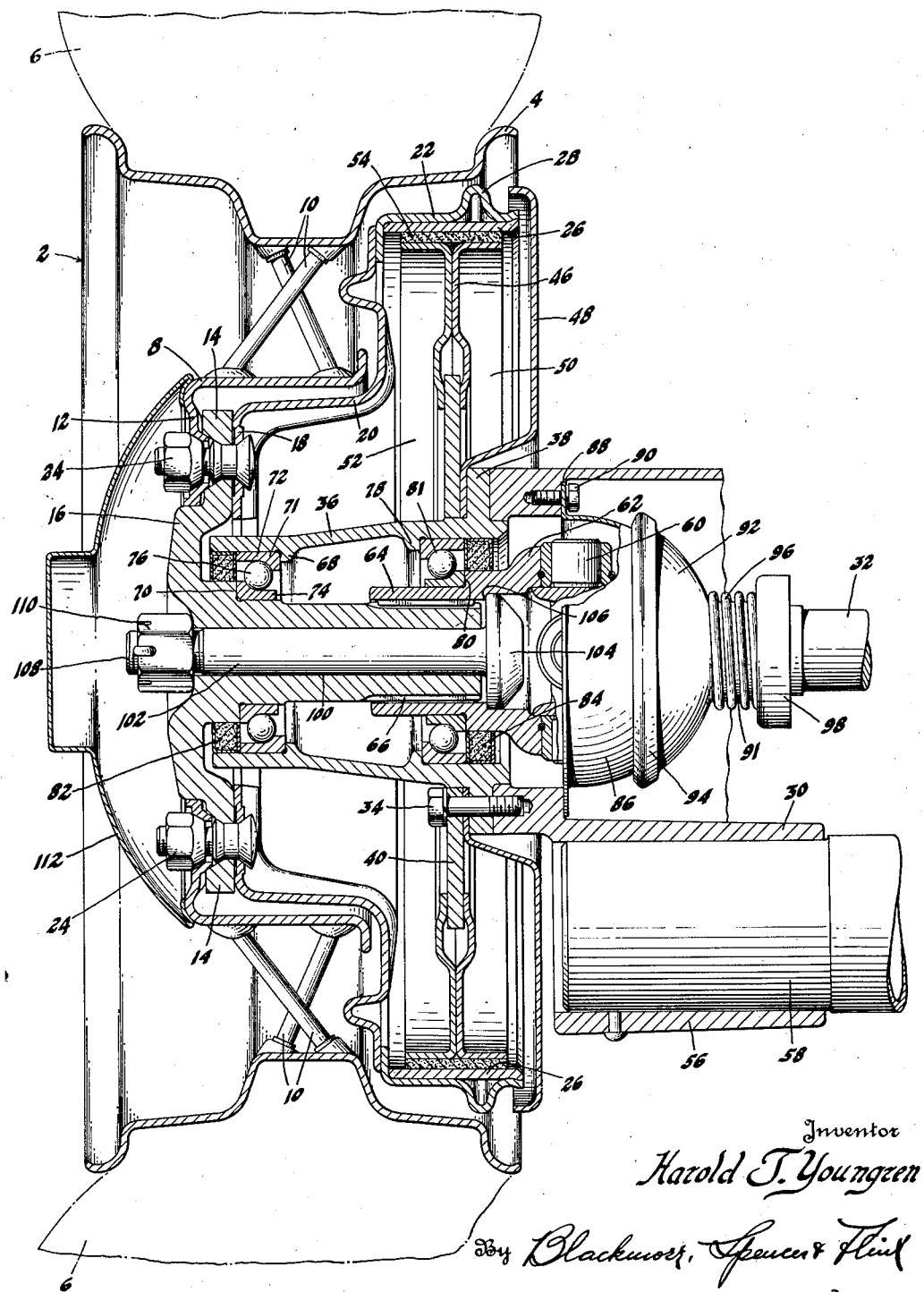
Inventor
Harold T. Youngren
By Blackmore, Spencer & Flint
Attorneys Patented Sept. 18, 1934

1,973,837

UNITED STATES PATENT OFFICE

1,973,837

DRIVE WHEEL MOUNTING

Harold T. Youngren, Flint, Mich., assignor to General Motors Corporation, Detroit, Mich., a corporation of Delaware Application May 5, 1933, Serial No. 669,499

2 Claims. (Cl. 180—75)

This invention relates to wheels used on automotive vehicles and their mounting and has particular reference to a device for adjusting the bearings of the drive wheels.

It is well known that the bearings on the wheels of automotive vehicles become worn after a time and necessitate adjustment. It has usually been necessary to withdraw the entire wheel and adjust the bearings after the wheel has been withdrawn. Even after the wheel was removed the adjustment of the bearing has been a vexatious task and none too easy to accomplish. It is the principal object of the present invention to build into the wheel an adjusting mechanism operable from the outside of the wheel and which will produce an adjustment of the wheel, or take up the slack produced by wear in the bearing, without necessitating the removal of the wheel.

On the drawing the single figure is a section through the drive wheel of an automotive vehicle showing the invention applied.

On the drawing the numeral 2 indicates a wheel as a whole. The wheel has the felly 4 shaped as shown in the drawing to receive the usual tire indicated in dotted outline at 6. The wheel has the outer hub 8 and connecting the hub 8 and the felly 4 are the wire spokes 10. The outer hub 8 has the inwardly extending flange 12 to which there are secured both the annular flange 14 of the axial hub 16 of the wheel and the annular flange 18 of the drum support 20 of the brake drum 22. Suitable bolts and nuts 24 secure the flanges 12, 14 and 18 together. The brake drum 22 has secured to the inside thereof the friction lining 26 and is also provided with the bead 28 for strengthening purposes.

The usual rear dead axle of a vehicle is indicated at 30 while 32 indicates the conventional live axle. The dead axle has secured thereto by means of the bolts 34 the extension hub 36 which projects into the interior of the wheel and is surrounded by the brake drum 22 and in turn surrounds the axial hub 16. The extension hub 36 has the flange 38 through which the bolts 34 pass into the dead axle 30, the bolts also securing in place the anchor plate 40 for the brake shoes 46, and the backing plate or dust guard 48, the backing plate being held between the anchor plate 40 and the flange 38. The shoes 46 are pivoted to the anchor plate 40 and are formed of two stampings 50 and 52 and have secured thereto the friction lining 54 which acts on the friction lining 26 when the brake is applied in order that the vehicle may be stopped.

The dead axle 30 has the extensions 56 and a cross rod 58 is secured thereto and extends across the vehicle and under the axle to strengthen the axle.

The live axle 32 has a universal joint 60 at the inner side of the wheel, one half of the universal joint being secured to the live axle proper and the second half 62 of the joint having formed thereon as a continuation of the live axle 32, a hub 64 which is splined, as shown at 66, to the axial hub 16 of the wheel. The wheel is accordingly driven from the live axle 32, through the universal joint 60, the splined connection 66, the axial hub 16, the flange 12 and the wheel hub 8 to the wheel 2.

The adjacent faces of the extension hub 36 and the axial hub 16 are provided with shoulders 68 and 70 respectively on which there is received the bearing 71 composed of the outer race member 72, the inner race member 74, and the balls 76. Toward the inside of the wheel the extension hub 36 and universal joint hub 64 are provided with the shoulders 78 and 80 respectively on which is positioned the bearing 81 in all respects similar to the bearing 71 except larger. Suitable outer and inner packing members 82 and 84 serve to hold lubricant and to prevent the entrance of foreign matter to the bearings.

The universal joint is also provided with a suitable housing 86, secured to the dead axle by means of the flange 88 and the machine bolts 90, to form a dust cover and oil housing. A mating housing member 92 fits over the housing 86 and has a rim 94 to hold packing to form an oil seal with the outer portion of the housing 86. A coil spring 96 is positioned over the neck 91 of the housing 92 and is urged toward the housing 86 by a shoulder 98. The spring 96 keeps the two housing portions 86 and 92 in oil tight engagement.

The axial hub 16 is bored as indicated at 100 and through the bore there extends the bolt 102, the head 104 of which is at the inside of the wheel and strikes against a shoulder 106 on the interior of the universal joint hub 64. The outer threaded end 108 of the bolt has a castellated nut 110 threaded thereon and by tightening the nut 110 the head 104 will be drawn toward the left, when considering the view in the figure, to pull the universal joint hub 64 to the left and thereby tightening the bearings 71 and 81. This movement of the universal joint hub 64 relative to the axial hub 16 will take up any play caused by looseness in the bearings.

As the result of the structure it will be seen that it is not necessary to remove the wheel to tighten the bearings. If, after a period of time in use, the bearings 71 and 81 become loose due to wear it is only necessary to tighten the nut 110 in order again to obtain tight bearings.

A cap 112 is removably secured over the wheel center or hub.

I claim:

1. In a wheel mounting for the driving wheels of automotive vehicles, a live axle connected to the wheels for driving the same, a dead axle having a hub receiving member, a bearing between said member and the live axle, said wheel having an axial hub received in said member, a bearing between said member and axial hub, said axial hub having a splined connection to the live axle, a bolt mounted in the axial hub and having its head on the inner side of the wheel and its threaded end on the outer side, and a nut operable from the outer wheel side to draw the head inwardly of the wheel to cause relative movement between the axial hub and live axle to tighten the bearings.

2. In a wheel mounting for the driving wheels of automotive vehicles, a live axle connected to the wheels for driving the same, a dead axle having a hub receiving member, a bearing between said member and the live axle, said wheel having an axial hub received in said member, a bearing between said member and axial hub, said axial hub having a splined connection to the live axle, a shoulder on said live axle at the inner side of the wheel, a bolt mounted in the axial hub and having its head on the inner side of the wheel in contact with said shoulder and its threaded end on the outer side of the wheel, and a nut operable from the outer wheel side to draw the head inwardly of the wheel against said shoulder to cause relative movement between the axial hub and live axle to tighten the bearings.

HAROLD T. YOUNGREN.